United States Patent [19]

Tsai

[11] Patent Number: 6,161,196
[45] Date of Patent: Dec. 12, 2000

[54] FAULT TOLERANCE VIA N-MODULAR SOFTWARE REDUNDANCY USING INDIRECT INSTRUMENTATION

[75] Inventor: Timothy Tsai, North Plainfield, N.J.

[73] Assignee: Lucent Technologies Inc., Murray Hill, N.J.

[21] Appl. No.: 09/100,826

[22] Filed: Jun. 19, 1998

[51] Int. Cl.$^7$ .................................................. G06F 11/00
[52] U.S. Cl. .............................. 714/10; 714/11; 714/35; 714/34; 714/797
[58] Field of Search ................................. 714/10, 11, 31, 714/25, 34, 35, 37, 38, 46, 57, 797

[56] References Cited

U.S. PATENT DOCUMENTS

| 5,297,274 | 3/1994 | Jackson | 703/22 |
| 5,452,441 | 9/1995 | Esposito | 714/13 |
| 5,974,565 | 10/1999 | Okuhara | 714/11 |

OTHER PUBLICATIONS

Tsai, Timothy "Fault tolerance via N–Modualr Software Redundancy" IEEE, 1998 p. 201–206.
Fuhrman, Christopher." Hardware/Software Fault Tolerance with Multiple Task Modular Redundancy" IEEE, 1995 p. 171–177.
Bondavalli, A;. "State Restoration in a COTS–based N–Modular Arhitecture" IEEE 1998, pp. 174–183.
J. Long, W. K. Fuchs, and J. A. Abraham, "Forward recovery using checkpointing in parallel systems," Proc. IEEE International Conference on Parallel Processing, pp. 272–275, 1990.
D. K. Pradhan and N. H. Vaidya, "Roll–forward and rollback recovery: Performance–reliability trade–off," Proc. 24th Fault–Tolerant Computing Symposium, pp. 186–195, 1994.
D. K. Pradhan and N. H. Vaidya, "Roll–forward checkpointing scheme: A novel fault–tolerant architecture," IEEE Transactions on Computers, 34(10):1163–1174, Oct. 1994.

Algirdas A. Avizienis, "The Methodology of N–Version Programming," in Michael R. Lyu, editor, Software Fault Tolerance, pp. 23–46, John Wiley & Sons Ltd., 1995.
Yi–Min Wang, et al., "Checkpointing and its applications," in Proc. 25th Fault Tolerant Computing Symposium, pp. 22–31, 1995.
R. A. DeMillo, et al., "An Extended Overview of the Mothra Software Testing Environment," IEEE, pp. 142–151, 1988.
J. Long, et al., "Implementing Forward Recovery Using Checkpoints in Distributed Systems," in J. F. Meyer and R. D. Schlicting, editors, Dependable Computing for Critical Applications 2, pp. 27–46, Springer–Verlag, 1991.

(List continued on next page.)

Primary Examiner—Robert W. Beausoliel, Jr.
Assistant Examiner—Bryce P. Bonzo
Attorney, Agent, or Firm—Ryan & Mason, L.L.P.

[57] ABSTRACT

Fault tolerance is provided in a computing system using a technique referred to as indirect instrumentation. In one embodiment, a number of different copies of a given target program are executed on different machines in the system. Each of the machines includes a controller for controlling the execution of the copy of the target program on that machine. The controllers communicate with a user interface of an instrumentation tool on another machine. A user specifies variables to be monitored, breakpoints, voting and recovery parameters and other information using the user interface of the instrumentation tool, and the tool communicates corresponding commands to each of the controllers for use in executing the copies. A fault is detected in one of the copies by comparing values of a user-specified variable generated by the different copies at the designated breakpoints. Upon detection of a fault in a given one of the copies, a checkpoint is taken of another one of the copies that has been determined to be operating properly, and a new copy is restarted from the checkpoint. The use of the controllers allows faults to be detected and appropriate recovery actions to be taken without modification of target program code.

19 Claims, 9 Drawing Sheets

OTHER PUBLICATIONS

G. A. Kanawati, et al., "FERRARI: A flexible software–based fault and error injection system," IEEE Transactions on Computers, 44(2):248–260, Feb. 1995.

K. H. Huang and J. A. Abraham, "Algorithm–based fault tolerance for matrix operations," IEEE, Transactions on Computers, C–33(6):518–528, Jun. 1984.

V. Balasubramanian and P. Banarjee, "Compiler assisted synthesis of algorithm–based checking in multiprocessors," IEEE Transactions on Computers, 39(4):436–447, Apr. 1990.

T. K. Tsai, et al., "An approach towards benchmarking of fault–tolerant commercial systems," in Proceedings of the 26th International Symposium on Fault–Tolerant Computing, pp. 314–323, Sendai, Japan, Jun. 1996.

Y. Huang and C. Kintala, "Software fault tolerance in the application layer," in Michael Lyu, editor, Software Fault Tolerance, chapter 10, Wiley, 1995.

G. S. Fowler, et al., A user–level replicated file system, in Usenix Conference Proceedings, pp. 279–290, Cincinnati, OH, Summer 1993.

J. H. Barton, et al., "Fault injection experiments using Fiat," IEEE Transactions on Computers, 39(4):575–582, Apr. 1990.

B. J. Choi, et al., "The mothra tools set," in Proceedings of the 22nd Hawaii International Conference on Systems and Software, pp. 275–284, Kona, Hawaii, Jan. 1989.

B.–H. Suh, et al., "FAUST—Fault Injection Based Automated Software Testing," Proceedings of the 1991 Systems Design Synthesis Technology Workshop, Silver Spring, Maryland, pp. 1–11, Jun. 1991.

FAULT TOLERANCE VIA N-MODULAR SOFTWARE REDUNDANCY USING INDIRECT INSTRUMENTATION

RELATED APPLICATION

The present invention is related to the invention described in U.S. patent application Ser. No. 09/100,827 entitled "Distributed Indirect Software Instrumentation," filed concurrently herewith in the names of inventors Reinhard Klemm, Navjot Singh and Timothy K. Tsai, and assigned to the assignee of the present invention.

FIELD OF THE INVENTION

The present invention relates generally to computing systems, and more particularly to techniques for providing fault tolerance in such systems.

BACKGROUND OF THE INVENTION

It is often desirable, in both distributed and non-distributed computing systems, to provide a mechanism for making the system tolerant to faults such as process failures and machine failures. The most important aspects of such fault tolerance mechanisms are generally error detection and error recovery. Conventional computing systems have been implemented which use process replication in conjunction with voting to perform error detection, and checkpointing to perform error recovery. Process replication generally involves running multiple copies of a given target program on different machines, and is also referred to as "N-version" or "N-modular" programming. Each of the copies of the program returns data values at specified breakpoints, and the voting process is used to determine if any of the processes or machines have failed. For example, if the returned data from all but one of the copies is the same, it can be assumed that the minority copy has experienced a failure. In the event of such a failure, a checkpoint is taken using one of the copies which is executing properly, and the failed process is restarted from the checkpoint. Details regarding these and other conventional techniques are described in, for example, J. Long, W. K. Fuchs, and J. A. Abraham, "Forward recovery using checkpointing in parallel systems," Proc. IEEE International Conference on Parallel Processing, pp. 272–275, 1990; D. K. Pradhan and N. H. Vaidya, "Roll-forward and rollback recovery: Performance-reliability trade-off," Proc. 24th Fault-Tolerant Computing Symposium, pp. 186–195, 1994; D. K. Pradhan and N. H. Vaidya, "Roll-forward checkpointing scheme: A novel fault-tolerant architecture," IEEE Transactions on Computers, 34(10):1163–1174, October 1994; and Algirdas A. Avizienis, "The Methodology of N-Version Programming," in Michael R. Lyti, editor, Software Fault Tolerance, pp. 23–46, John Wiley & Sons Ltd., 1995.

Conventional fault tolerance techniques generally require the modification of either source code or binary executable code to add the above-noted error detection and recovery functionality. These modifications are typically performed prior to execution of the target program and often require the user to edit files or to run direct instrumentation software, which can be inefficient. Moreover, conventional techniques which rely on an operating system to detect errors have the disadvantage of being unable to preserve data integrity when no operating system exception is triggered. Other conventional schemes use algorithm-based detection methods that are generally not applicable to many types of programs.

SUMMARY OF THE INVENTION

The invention utilizes a technique referred to as indirect software instrumentation to achieve fault tolerance in a computing system. An illustrative embodiment is implemented in a system which includes a number of computers or other machines. Different copies of a given target program are executed on different machines in the system. Each of the machines executing a copy of the target program includes a controller for controlling the execution of that copy. The controllers each communicate with a user interface of an instrumentation tool which may be implemented on another machine. A user interacts with the interface to specify the variables to be monitored or "voted" on, breakpoints at which the voting takes place, voting and recovery parameters and other information, and the tool communicates corresponding commands to each of the controllers. A fault is detected in one of the copies by comparing values of one or more of the user-specified variables generated by the different copies at the designated breakpoints. At a given breakpoint, the controllers report these values to a vote processing mechanism which may be implemented on any one or more of the machines of the system, and the vote processing mechanism determines whether a fault has occurred. Upon detection of a fault in a given one of the copies, a checkpoint is taken of another one of the copies that has been determined to be fault-free, and a new copy is restarted from the checkpoint. The use of separate controllers for controlling execution of each of the copies of the target program based on user-specified information allows faults to be detected and appropriate recovery actions to be taken without modification of target program code. Other embodiments may be implemented using a single machine for executing each of the copies, or may execute multiple copies on certain machines.

The invention provides a general error detection and recovery technique that ensures data integrity for critical data without the need for any modification of source code or executable code, while also providing a high degree of automation and transparency for fault-tolerant configuration and operation. The invention is suitable for use with many different types of programs. In addition, the invention provides the ability to perform error detection for applications for which no source code or only minimal knowledge of the code is available, including so-called "legacy" applications. The types of faults that are tolerated in the illustrative embodiment include transient and permanent hardware faults on a single machine and certain types of application and operating system software faults, although other embodiments can provide other types of fault tolerance.

DETAILED DESCRIPTION OF THE INVENTION

The present invention will be illustrated below in conjunction with an exemplary computing system. It should be understood, however, that the invention is not limited to use with any particular type of computing system, but is instead more generally applicable to any computing environment or application in which it is desirable to provide fault tolerance in a more efficient manner than has heretofore been possible. The disclosed techniques can be utilized with computers or other machines arranged in local area networks, wide area networks, metropolitan area networks, intranets, extranets and global networks such as the Internet. The term "program" as used herein is intended to include any type of instruction, code, process, thread or the like which runs on a computer or other machine in a computing system. The term "distributed system" is intended to include any system which includes two or more computers or other machines. The term "machine" as used herein should be understood to include a computer, a workstation or any other type of data processing device as well as various components of such devices. The term "remote machine" as used herein refers generally to any computer, workstation or other data processing device which executes a process on behalf of another machine. A remote machine in accordance with the invention therefore need not be geographically remote from the host machine. The term "indirect instrumentation" refers to instrumentation that can be implemented without directly altering either the source code or the executable code of an instrumented target program. An "instrumentation tool" refers generally to any software program which implements at least a portion of an instrumentation process. The term "controller" refers generally to any software program or other mechanism which provides one or more of the functions described herein as associated with a backend of an instrumentation tool, and may be used to designate the entire backend as well as an element or elements of the backend.

Software instrumentation refers generally to the process of modifying a program to include additional code, referred to as instrumentation code, which is designed to provide various types of monitoring and analysis of program performance during program execution. Instrumentation, in addition to monitoring and analysis of program performance, also includes other activities such as modifications for fault tolerance, e.g., checkpointing, and fault injection. Instrumentation thus typically involves some modification of a target program to alter or add functionality. For example, instrumentation code may be used to provide indications as to whether or not particular branches are taken when a program is executed with a given set of inputs, or to interrupt a processor during execution in order to aid in fault location.

Figure 1:
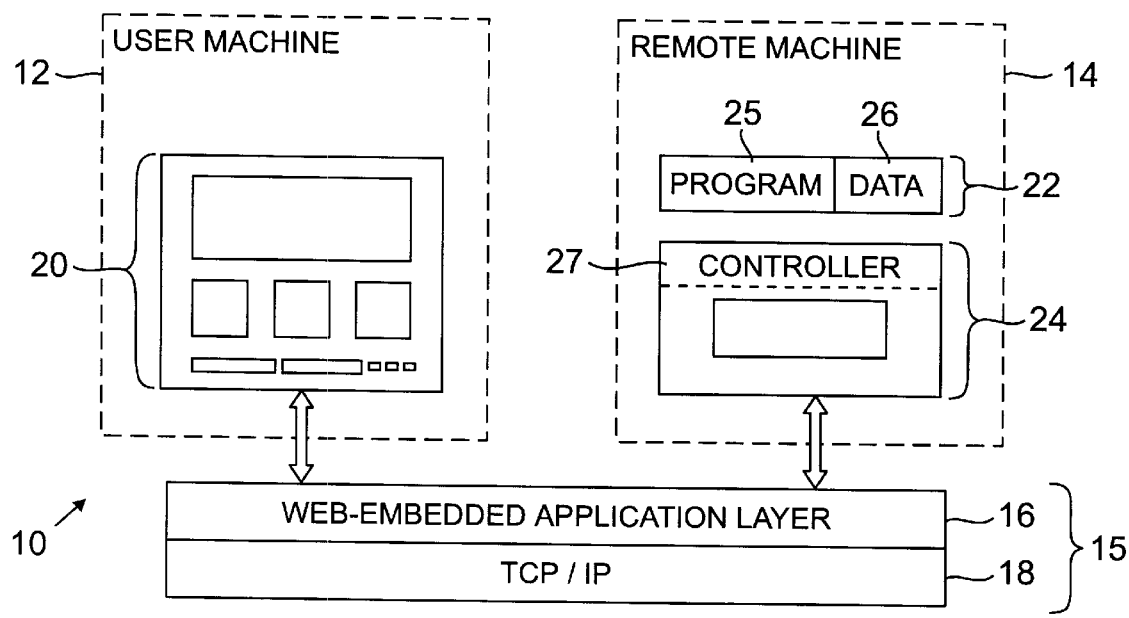
FIG. 1 is a block diagram of an illustrative embodiment of an indirect instrumentation software tool which may be used to implement fault tolerance in accordance with the invention.

FIG. 1 illustrates the general architecture of an indirect instrumentation software tool which may be used to provide fault tolerance in accordance with the invention. This embodiment is implemented in a distributed system 10 which includes a user machine 12 and a remote machine 14. The user machine 12 and the remote machine 14 communicate via a communication medium 15 which in this embodiment includes a web-embedded application layer 16 and a conventional Transmission Control Protocol/Internet Protocol (TCP/IP) layer 18. The web-embedded application layer 16 may be any suitable message-passing mechanism configured to operate with the TCP/IP layer 18. Additional details regarding an exemplary web-embedded application layer can be found in the above-cited U.S. patent application Ser. No. 09/100,827. Other types of communication media may be used in alternative embodiments. Moreover, other embodiments of the indirect instrumentation tool may be implemented using a single machine, or more than two different machines.

The indirect instrumentation software tool includes a "frontend" portion and a "backend" portion. The frontend is implemented on the user machine 12 and includes, among other elements, a "creation" graphical user interface (GUI) 20. The frontend may be, for example, one or more Java applets that can be executed on a Java-enabled computer or other suitable machine. The backend is implemented on the remote machine 14 and includes two software processes: a target program 22, i.e., the program that is to be instrumented, and backend software 24 that performs the instrumentation on the target program 22. As will be described in greater detail below, the backend software 24 may be comprised of multiple processes and threads. Within target program 22, element 25 represents the control-flow execution of the target program, and element 26 represents the data space of the target program. The backend software 24 includes a controller 27. The frontend provides an interface between the user and the backend software 24 which controls the target program 22. In a fault tolerant computing implementation, the frontend also serves to provide voting functions and coordination of multiple backends. The GUI 20 of the frontend is preferably point-and-click driven and has pull-down menus, windows, lists, buttons, and text fields, as will be described in greater detail in conjunction with FIGS. 3A–3B.

The controller 27 running on remote machine 14 directs the control flow of the target program 22 and provides observability into the internal state of the program 22 as it executes. The controller 27 has the ability to direct the target program to commence, suspend, and terminate execution at any point. It also is able to view and manipulate the entire data space of the target program, including static and dynamic data and processor registers. The controller 27 may include a debugger, e.g., a conventional gdb or dbx debugger, or a low-level facility provided by the operating system, e.g., a conventional ptrace facility or the /proc file system in UNIX, which serves as the part of the backend that directly controls and communicates with the target program 22. It will be assumed that in the illustrative embodiment the controller 27 includes the gdb debugger as described in R. M. Stallman, "Debugging with GDB: the GNU Source-Level Debugger," 4.12 edition, January 1994, which is incorporated by reference herein. Although alternatives exist for use in the controller 27, the gdb provides the desired functionality and has been extensively tested and ported to many platforms. The controller 27 allows indirect instrumentation to be automated, such that the amount of hand-coded instrumentation code is reduced to the greatest extent possible. The user of the instrumentation tool interacts primarily with the GUI 20 of the frontend, while the instrumentation is performed by the controller 27 of the backend. The distributed configuration of the indirect instrumentation software tool expands its utility beyond conventional software instrumentation and makes possible the implementation of distributed software fault tolerance in a manner to be described below.

It should be noted that although the instrumentation tool in the illustrative embodiment includes a controller which has a debugger as one of its components, the tool itself provides additional capabilities typically not found in a debugger. A debugger is generally capable of performing many low-level tasks such as managing breakpoints, executing debugger commands when breakpoints are encountered, and printing and modifying the values of variables. In contrast, the instrumentation tool in the illustrative embodiment configures the debugger in the controller 27 to perform all the tasks needed in an automated, transparent, and distributed manner. In addition, the instrumentation tool adds the capability of incorporating and executing user-specified code in conjunction with the target program 22 to perform tasks that a debugger alone is unable to do. The instrumentation software tool also provides other unique features, such as, for example, an automated feedback mechanism that triggers the aforementioned user-specified code when a designated event occurs.

Figure 2:
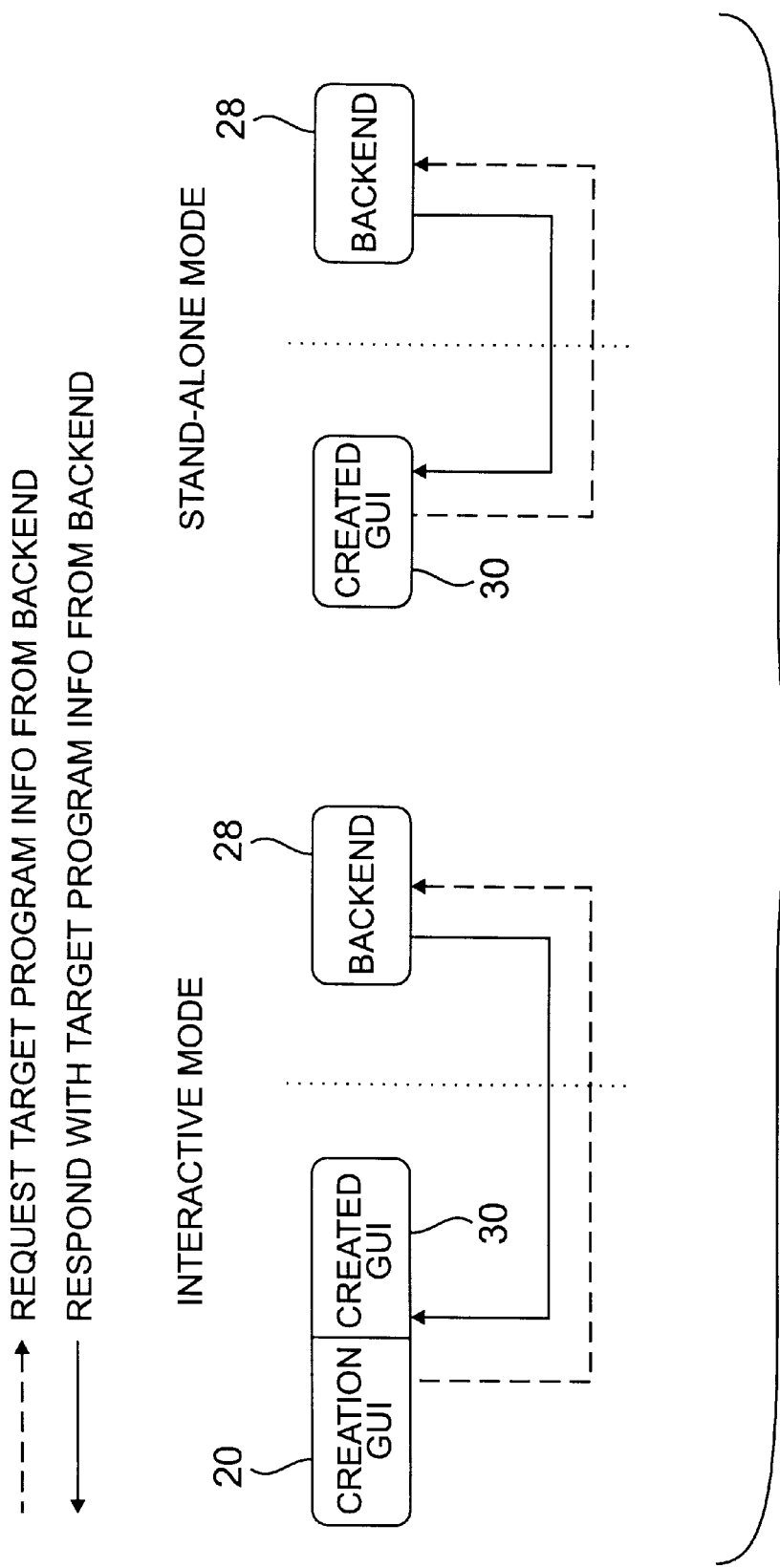
FIG. 2 illustrates different operating modes supported by the FIG. 1 embodiment.

FIG. 2 illustrates two operating modes of the instrumentation tool of FIG. 1. As previously noted, the instrumentation tool supports the instrumentation of a target program 22 by providing a creation GUI 20. In an interactive mode of operation, the creation GUI 20 allows the user to create a customized "created" GUT 30, which then connects to a backend 28 as shown. Both the creation GUI 20 and the created GUI 30 are associated with the frontend portion of the instrumentation tool, and thus run on the user machine 12 in the illustrative embodiment. The backend 28 includes the backend software 24 with controller 27 and is implemented on the remote machine 14. While the user interacts with the creation GUT 20, the created GUI 30 is built in a separate window that can be immediately reviewed and modified if necessary. The creation GUT 20 requests target program information from the backend 28, as indicated by the dashed line, and the backend 28 responds to the created GUI 30 with the requested information, as indicated by the solid line. Once the user is satisfied with the instrumentation and the created GUI 30, a final version of the created GUI 30 can be generated for a stand-alone mode of operation in which that version can be run independently of the creation GUI 20. In this stand-alone mode, the created GUI 30 directly requests target program information from the backend 28 during target program execution, as indicated by the dashed line, and the backend 28 responds to the created GUI 30 with the requested information, as indicated by the solid line. A user will typically first enter the interactive mode to tailor the created GUI 30, and then subsequently run the resulting created GUI 30 in the stand-alone mode.

Figure 3A:
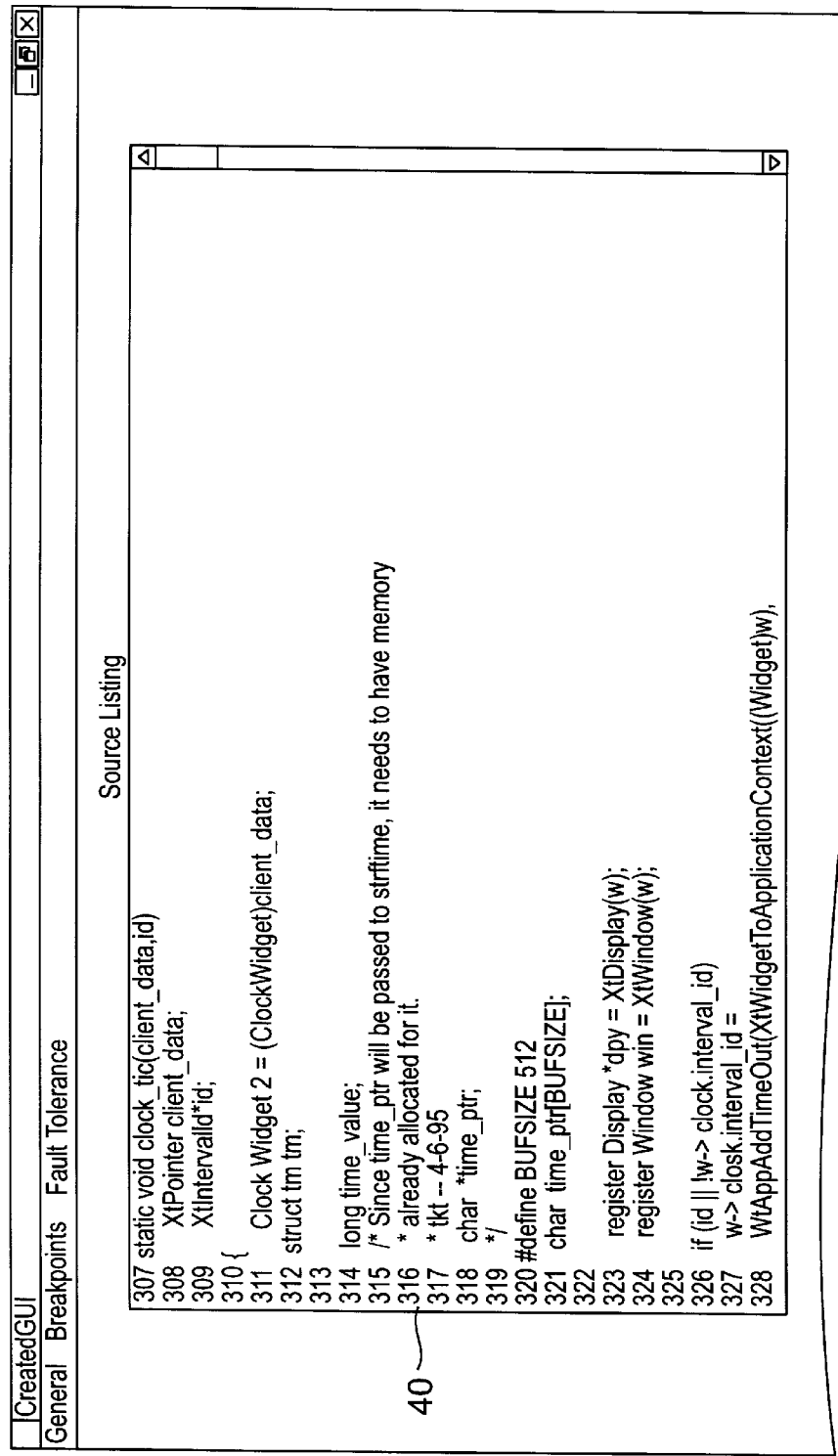
FIGS. 3A–3B and FIG. 4 show creation and created graphical user interfaces (GUIs), respectively.
Figure 3B:
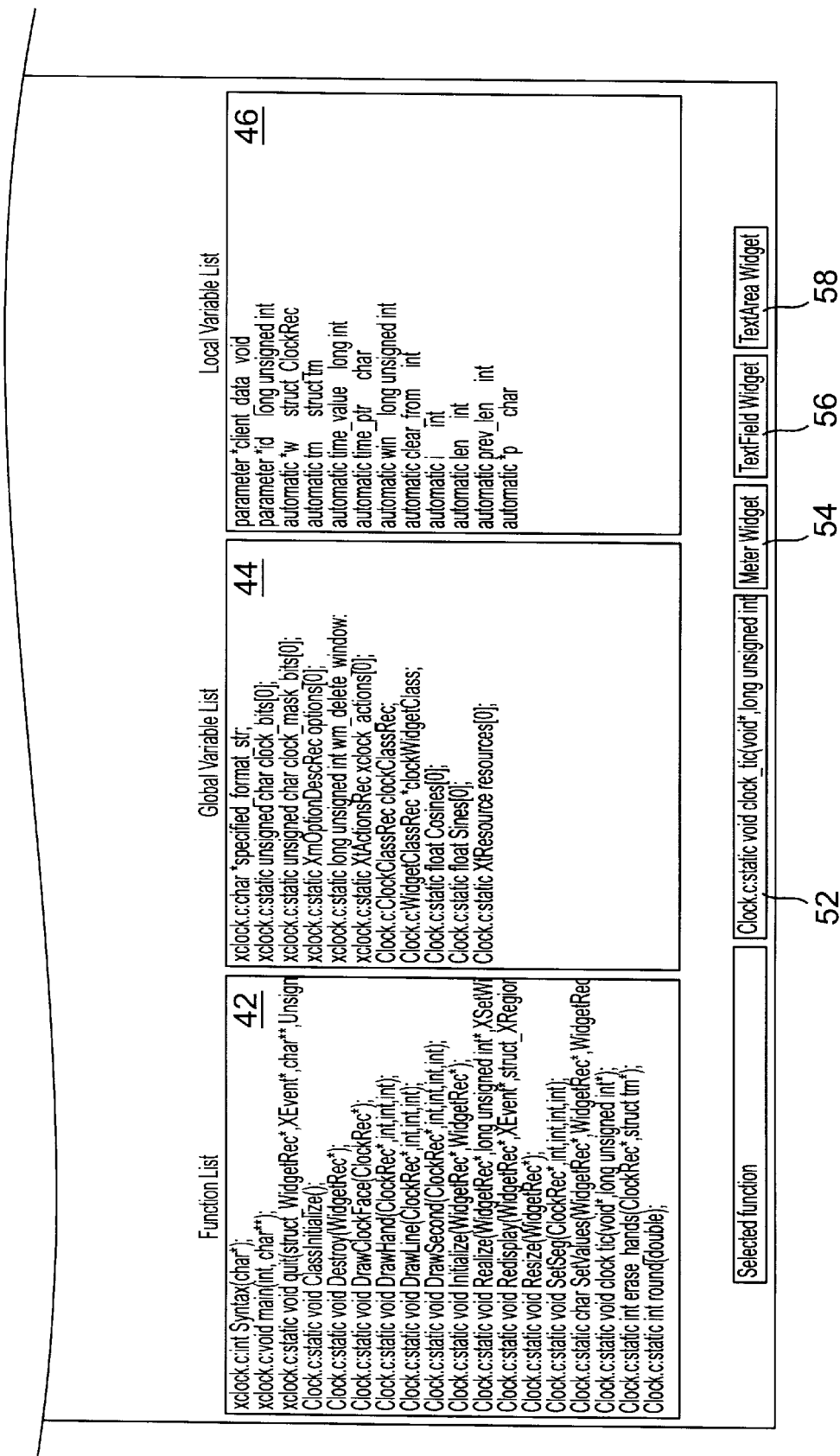
Figure 4:
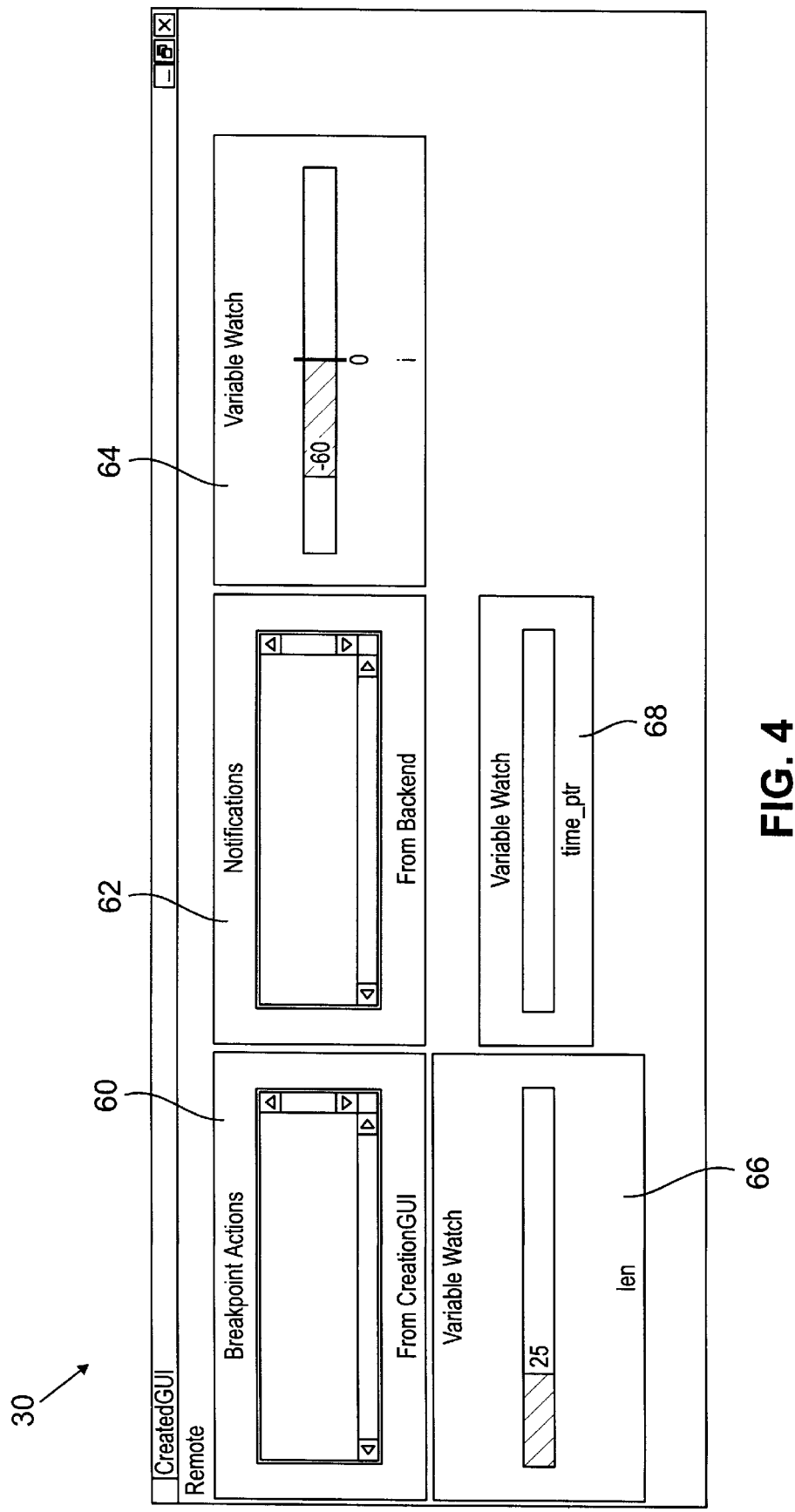

FIGS. 3A–3B and FIG. 4 show examples of a creation GUI 20 and a created GUI 30, respectively, in accordance with the invention. The creation GUI 20 of FIGS. 3A–3B includes a source listing window 40, a function list 42, a global variable list 44 and a local variable list 46. A given function selected from the function list 42 is highlighted in the list 42 and displayed in a text field 52 as shown. The corresponding global and local variables for the selected function are displayed in the respective global variable list 44 and local variable list 46, while the source code for the function is displayed in the source listing window 40. A number of buttons are provided, including a meter widget button 54, a text field widget button 56 and a text area widget button 58. These buttons allow a user to specify particular widgets which will appear in the created GUI 30. For example, the meter widget button 54 may be used to specify a particular variable to be monitored in a visually perceptible format in the created GUI 30. One such format is a horizontal bar whose length is proportional to the value of the associated variable. Other types of widgets include, for example, pie chart widgets, time-line widgets, etc. These and other widget classes can be included in a basic graphical widget library that can be extended by the user.

Although not illustrated in FIGS. 3A–3B, a number of pull-down menus may be provided in the creation GUI 20.

For example, the creation GUI 20 may include a menu for commands related to the target program as a whole, such as commands to load, run, interrupt, interrupt periodically, or terminate the target program. Another menu may provide instrumentation commands, such as commands for setting breakpoints associated with source code lines or commands to specify trigger mechanisms for user-defined functions. The creation GUI 20 thus allows a user to select and configure instrumentation operations provided by the instrumentation tool. For example, if a particular instrumentation command selected from a pull-down menu requires user-specified parameters, the user can enter these parameters via a keyboard into a corresponding text field. The target program information displayed in the windows and lists of the creation GUI 20 may be requested by creation GUI 20 from the backend, as previously described.

The created GUI 30 of FIG. 4 includes a window 60 for listing breakpoint actions specified by the user in the creation GUI 20, and a window 62 for listing notifications received from the backend in response to the breakpoint actions or other user-specified instrumentation. The created GUI 30 further includes a set of variable watch windows 64, 66 and 68 for specifying the current status of selected variables i, len and time_ptr, respectively. It should be noted that the selected variables are illustrative for the chosen target program, and many other types of variables could be monitored. The variable watch windows are examples of meter widgets that can be specified using the meter widget button 54 in the creation GUI 20 of FIGS. 3A–3B. The created GUI 30 thus provides a display of the user-specified instrumentation generated from the creation GUI 20. As previously noted, the created GUI 30 may be run in a stand-alone mode in which it interacts with the backend to obtain the necessary information regarding the target program as the program executes. A user thus uses the instrumentation-generation features of the creation GUI 20 to generate a customized created GUI 30 which interacts with the backend to provide the target program information required for the instrumentation.

Figure 5:
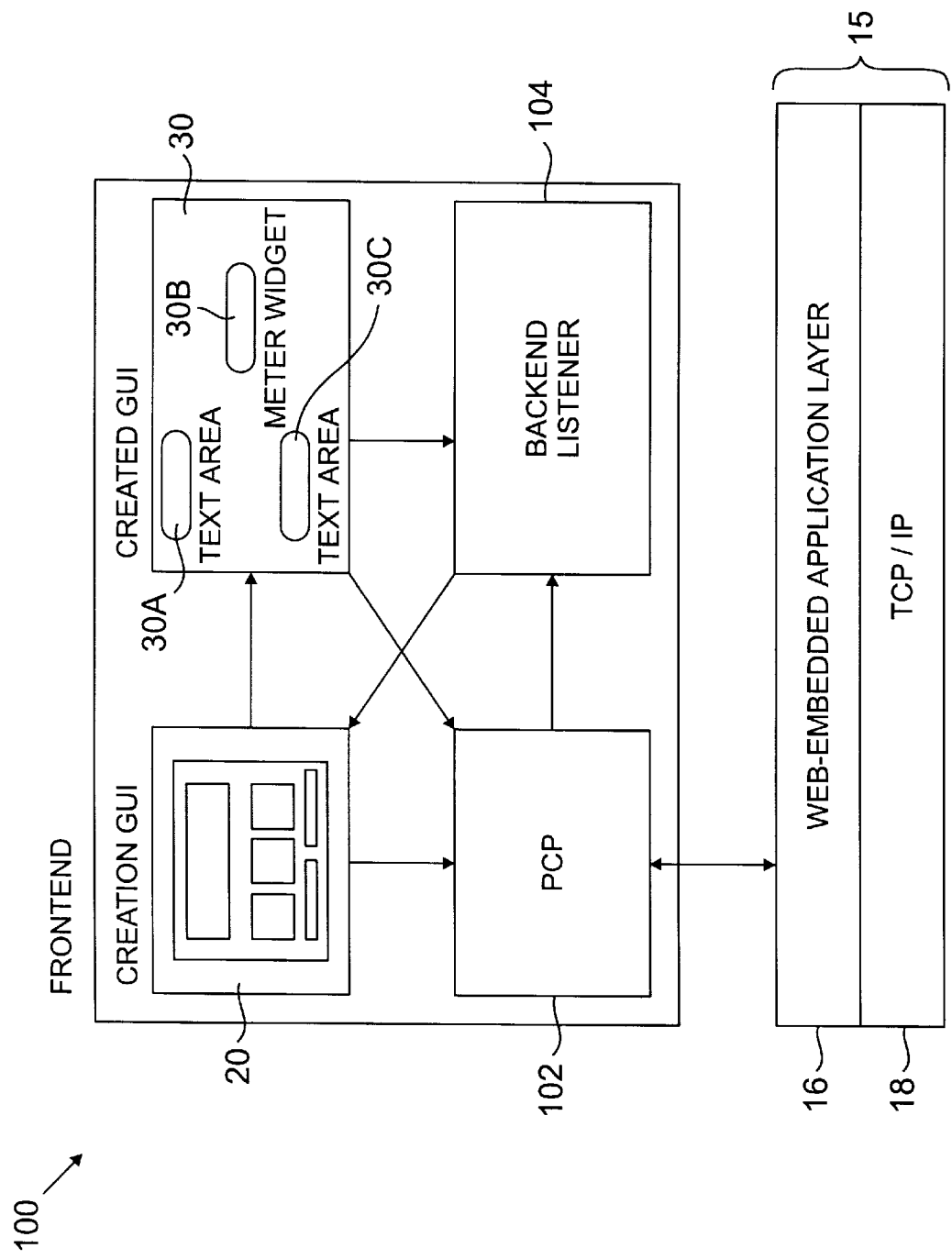
FIGS. 5 and 6 show more detailed views of the frontend and backend portions, respectively, of the FIG. 1 instrumentation tool.

FIG. 5 illustrates an exemplary frontend 100 of the instrumentation tool in greater detail. The frontend 100 includes the creation GUI 20 and the created GUI 30 as previously described. The created GUI 30 includes text area code 30A, meter widget code 30B and text field code 30C. The sets of code 30A, 30B and 30C are responsible for generating corresponding portions of the graphical display of the created GUI 30 as shown in FIG. 4. The graphical output of the sets of code 30A, 30B and 30C will be displayed as part of the created GUI 30 depending on whether the user decides to use a particular widget as part of the GUI 30. The frontend 100 further includes a Prism Communications Protocol (PCP) element 102 for implementing communications between the frontend 100 and one or more backends, and a backend listener 104 for receiving communications from the one or more backends via the communication medium 15.

Figure 6:
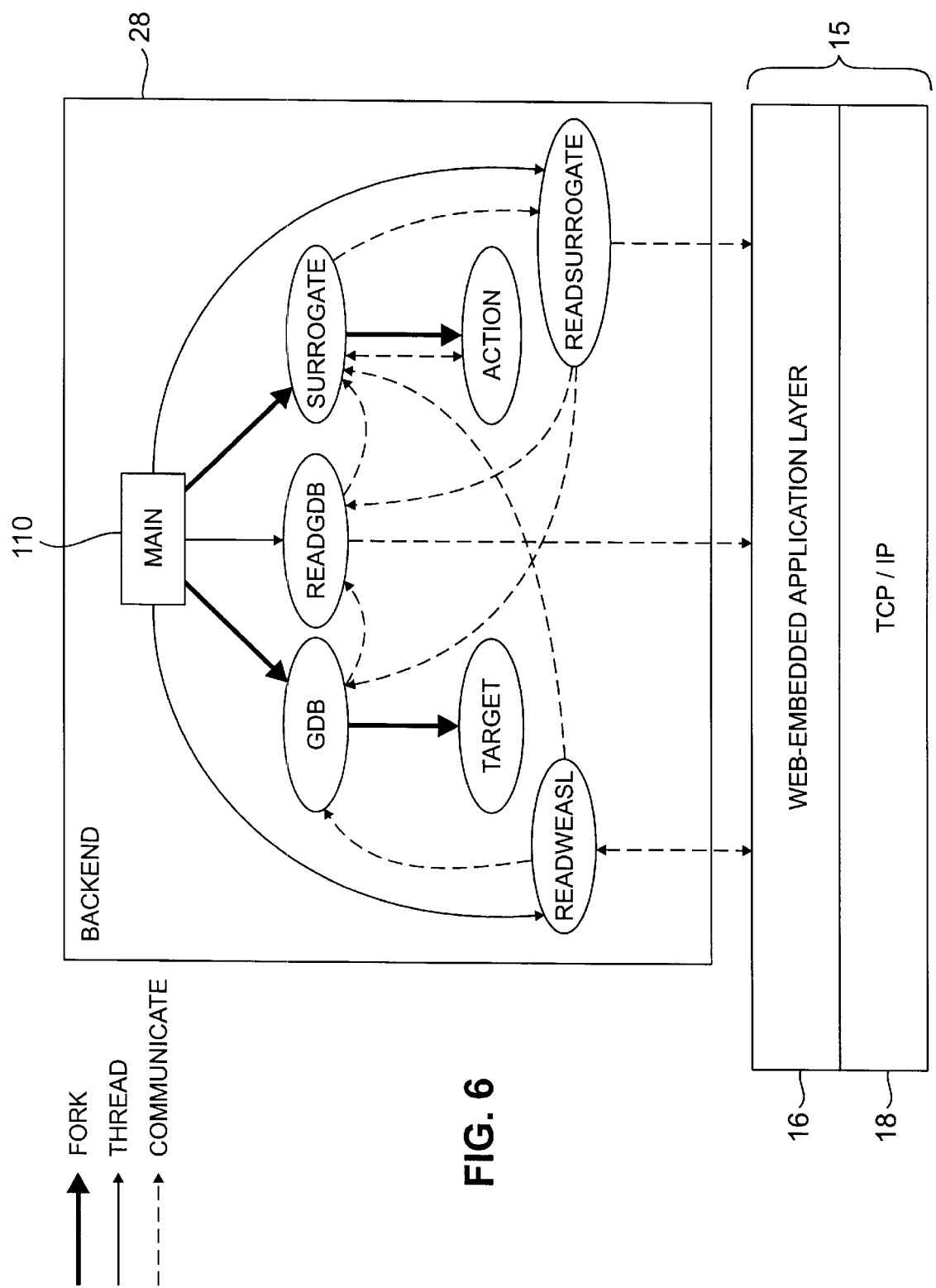

FIG. 6 shows an exemplary backend 28 in greater detail. In order to handle the variety of responsibilities required of it, the backend in this embodiment is partitioned into several different components. These components generally execute in parallel, with some executing as forked processes and others executing as threads. Whenever possible, threads are used, except when the components must fork off additional processes themselves. Multiple threads can form a single process, since they share the same memory space. In FIG. 6, thick solid arrows indicate a fork of a given process, thin solid arrows indicate a thread of a given process, and dashed arrows indicate communication. The backend 28 in this embodiment includes a main process 110 which controls its operation. A debugger process gdb and another process surrogate are started as forks from the main process, and readgdb, readweasl and readsurrogate are threads of the main process. The readgdb thread is responsible for reading information from the gdb process, the readweasl thread is responsible for reading information from the communication medium 15, and the readsurrogate thread is responsible for reading information from the surrogate process. The gdb process controls debugger operations undertaken by the backend 28, as illustrated by a target process started as a fork from the gdb process. The surrogate process controls actions undertaken by the backend 28, as illustrated by an action process started as a fork from the surrogate process.

As previously noted, the backend 28 serves as a controller for the target program. All requests from the frontend 100 are handled by the backend, and all output from the target program 22 to the frontend is transferred by the backend. Thus, the backend in this embodiment is the only interface between the frontend and the target program. The operations that the backend performs on the target program constitute the basis of indirect instrumentation. In addition to serving as the interface between the target program and the frontend, the backend also performs other important functions. First, backend actions can be specified by the user for execution whenever a desired trigger condition is encountered. These actions perform calculations, alter the execution of the target program, including target program variable values, send output to the frontend, start up additional programs, or perform other functions. In addition to implementing actions, the backend may also contain its own internal counters, which can be used as variables in addition to the target program variables. These backend actions and counters are very powerful and provide the ability to alter the execution of the target program in many different ways. Actions supported by the backend, and the corresponding triggers for these actions, are described in greater detail in the above-cited U.S. patent application Ser. No. 09/100,827.

In accordance with the invention, the above-described instrumentation tool may be used to provide fault tolerance in a computing system. Indirect instrumentation is useful for adding functionality to a program in a manner that provides a large degree of transparency and automation for the user. This is particularly true for adding fault tolerance to a program that has not been developed with any explicit fault tolerance capabilities. With indirect instrumentation, such a non-fault tolerant program can be executed in a fault-tolerant mode after a few minutes of configuration via a creation GUI. No source code modification or recompilation is required because the error detection or recovery software is contained primarily within the controller program. It should be noted that the invention does not require any access to source code, which means that even so-called "legacy" code can be made fault tolerant using the techniques of the invention. If the target program source code is not available, then the instrumentation can be performed using a symbol table attached to the target program. If no symbol table is available, all references to the target program may be in terms of virtual addresses.

The indirect instrumentation based fault tolerance in accordance with the invention can provide generally applicable error detection that preserves the data integrity for an explicitly selected set of critical data. The fault types that are tolerated in the embodiment to be described below include all single occurrences of transient or permanent hardware faults, as well as software faults that cause error conditions in the operational environment. Faults that are not detected in this embodiment include communication faults and other software faults that only cause internal value errors.

Figure 7:
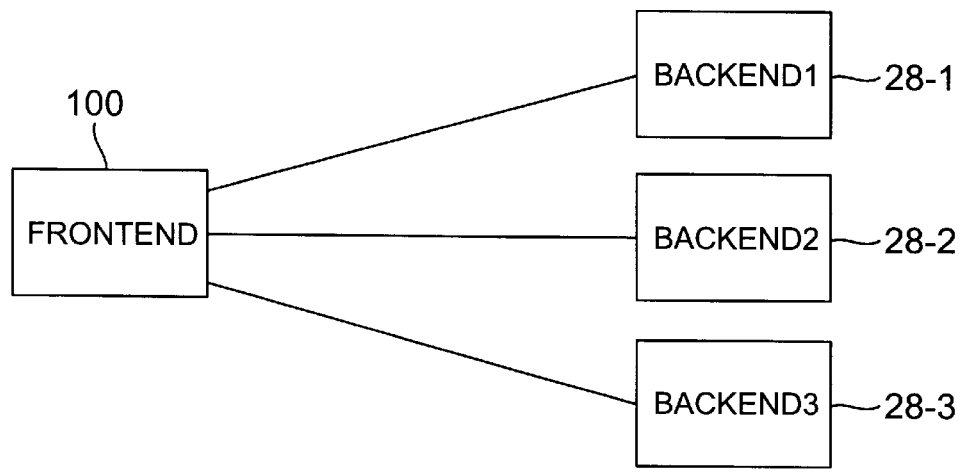
FIG. 7 illustrates an exemplary embodiment of a computing system in accordance with the invention which utilizes indirect instrumentation to provide fault tolerance.

FIG. 7 shows an illustrative embodiment of a computing system with fault tolerance in accordance with the invention. This embodiment includes a frontend 100 and three separate backends 28-1, 28-2 and 28-3, also designated as backend1, backend2 and backend3, respectively. The frontend 100 and the three backends 28-i may each be configured in the manner described above. It will be assumed in this example that the frontend 100 and the backends 28-i each correspond to a different machine, although this is not a requirement of the invention. Placing the frontend and backends on different machines tends to maximize performance and error containment for each backend. In other embodiments, one or more of the frontend 100 and the backends 28-i may be implemented on the same machine. As previously noted, the most important aspects of fault tolerance are generally error detection and error recovery. Error detection in the FIG. 7 embodiment is accomplished via replication of a given target program on three different machines, with each copy of the target program controlled by one of the separate backends 28-i on one of the three machines. These backends communicate with the single frontend 100, which serves as a coordinator for the backends 28-i and is operative to determine discrepancies among the different copies of the target program as the copies execute. Recovery from detected errors is accomplished via a checkpointing and restart mechanism to be described below.

In operation, each of the copies of the target program may be temporarily stopped at the beginning of the first program instruction. At that point, the user selects the desired voting parameters, e.g., variables to be voted upon and voting times, and recovery parameters, using a creation GUI of the frontend 100. In other embodiments, only a subset of these or other similar parameters are specified by the user. The frontend 100 then sends the corresponding commands to each of the backends 28-i. The frontend creation GUI described above may be modified in a straightforward manner to allow this user specification of the voting parameters and recovery parameters. When the appropriate breakpoints have been inserted by the backends 28-i, the execution of all copies of the target program is resumed. For each breakpoint, each backend 28-i will report the value of preselected critical variables to the frontend 100. If the frontend 100 finds that all reported values are identical, then it instructs each backend 28-i to continue execution of its copy of the target program.

Figure 8:
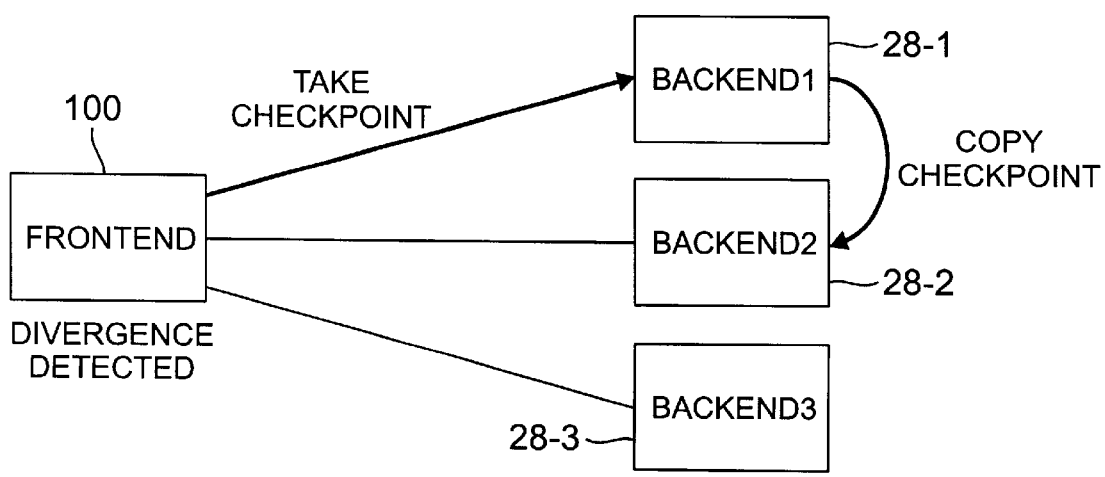
FIG. 8 illustrates checkpointing in the embodiment of FIG. 7.

FIG. 8 illustrates a situation in which the frontend 100 detects a divergence in the reported values from the backends 28-i. The backend with the minority value is identified as the erroneous backend, and execution of the target program is terminated on the corresponding machine. The erroneous backend in this example is backend2 (28-2). A checkpoint is then taken from one of the non-erroneous backends, e.g., backend1 (28-1), and that checkpoint data is copied to the machine with the erroneous backend, i.e., backend2 (28-2), and a new target program is initiated on backend2 using the checkpoint data. In this manner, errors are detected and corrected through a checkpointing recovery mechanism.

Note that in this embodiment a checkpoint is only taken when an error is detected, which should be a relatively infrequent occurrence. However, alternative embodiments could utilize other types of checkpointing, including periodic checkpointing. The frontend 100 in the illustrative embodiment acts as a vote counter for data that is collected from the replicated backends 28-i. The vote management code utilized by frontend 100 may include management code for synchronization of the backends. For recovery, the libckp checkpointing package as described in Y. -M. Wang, Y. Huang, K. -P. Vo, P. -Y. Chung, and C. Kintala, "Checkpointing and Its Applications," Proc. 25$^{th}$ Fault-Tolerant Computing Symposium, pp. 22–31, 1995, which is incorporated by reference herein, may be used to perform restarting and migration of target program processes that have been determined to be erroneous. Any number of backends, and therefore any number of copies of the target program, can be supported, although at least three backends are generally required to perform error detection in the illustrative embodiment of FIG. 7.

Although the actual vote processing in the above embodiment may be based on a straightforward comparison of reported values, a number of issues should be addressed. For example, the copies of the target program generally execute independently. Thus, a synchronization mechanism may be needed to ensure that all copies of the target program are at the identical logical execution point when the values are reported. One convenient method to guarantee this synchronization is to insert the breakpoints at the same addresses in all copies. The breakpoints serve as a form of barrier synchronization, where all copies must wait until the last copy reaches the breakpoint. In addition, vote processing should only be performed upon data that is deterministic and is therefore guaranteed to be identical for all copies, which will usually exclude data such as machine names, non-global clock times, and dynamic virtual addresses. The data should be delivered to the frontend 100 in a standardized format. The use of a debugger as the backend controller program provides a convenient method for standardizing data. If symbolic information for the target program is available, then the data to be voted upon can be specified as variable names. Otherwise, data can still be specified in terms of virtual addresses.

Replicated input and output in the illustrative embodiment can be handled by, for example, copying input to all replicated target programs and sinking the output from all but one backend that is designated as the primary. This type of input/output (I/O) management could be performed by trapping all read( ) and write( ) system calls. However, such a read( )/write( ) technique generally does not handle memory-mapped I/O and ioctl( ) calls. Other suitable techniques could also be used to provide I/O management in the illustrative embodiment.

A number of issues also should be considered with regard to checkpointing. The code to save the checkpointed process state to a file and to restart a new process from the checkpointed data file can either be part of the target program or exist externally to the target program. If the checkpoint code is intended to be part of the target program, then it may be integrated with the original target program by source code modification, compile-time linking, or run-time linking. If the checkpoint code is external to the target program, then a checkpointing package that is totally separate from the instrumentation may be used to perform the checkpoint operations, or the backend controller can be used to perform the checkpoint operations. The latter option has the advantage of being more platform independent, especially if symbolic information is used to store the checkpointed data in a standard intermediate format.

A newly restarted copy of the target program should be synchronized with the original copies of the target program. This may be of particular concern if the checkpointing code is integrated into the target program. In that case, both the restarted copy of the target program and the checkpointed target program will execute code asymmetrically. The restarted copy does not necessarily have to be restarted at the same location as the other copies. It just has to be restarted at a location such that the next vote point it reaches will be identical to that for the other copies. This implies that the set of voting breakpoints should be preserved when restarting the new copy of the target program.

A policy may be established to specify the machine to use to restart the target program. For example, the new copy of the target program may be restarted on the same machine up to a maximum restart threshold of X times, where X>=0. If a target program is restarted on a different machine, then a checkpoint file must be copied to the new machine, which must be sufficiently similar to the failed machine to be able to restart the target program using the copied checkpoint file.

Figure 9:
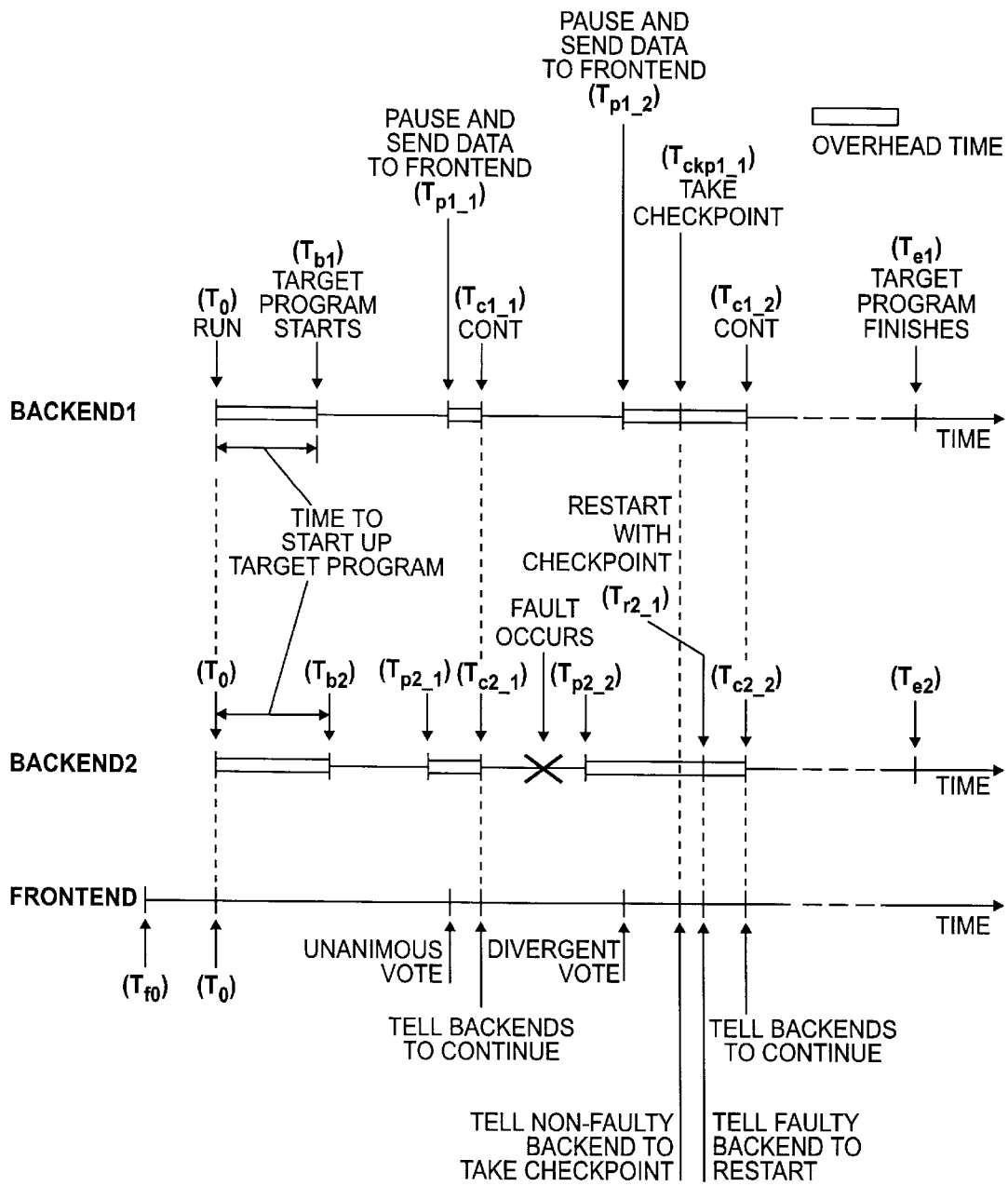
FIG. 9 is a timing diagram illustrating the operation of the embodiment of FIG. 7.

FIG. 9 is a diagram illustrating an example of a sequence of events for the fault tolerance implementation of FIG. 7. Three time lines are shown to represent the events for two of the backends 28-i and the frontend 100. Although more than two backends are present in the configuration of FIG. 7, the only two for which information is displayed in this example time line are the backend that experiences an error, e.g., backend2 (28-2), and the backend that creates the checkpoint to be used for recovery, e.g., backend1 (28-1). The subscripts associated with recurring events are of the form $T_{xi\_j}$, where x is the type of event, i identifies the backend, and j distinguishes the events for each backend. Broken vertical lines are drawn for events that occur simultaneously. Also note that the diagram is not drawn to scale.

Assume that a fault occurs on backend2 and that this fault affects a value for a data variable that has been selected for voting. This fault occurrence is shown in FIG. 9 as an X. After the fault occurs, the backends all pause at time $T_{pi\_j}$ to send their data to the frontend 100. This time, the voting is not unanimous due to the fault. If at least three backends participated in the vote, then the two non-faulty backends should present the same data value to the frontend. In this manner, the frontend is able to determine which backend is erroneous. The recovery process is then initiated. The frontend instructs one of the non-erroneous backends to produce a checkpoint of its state in the form of a checkpoint file. In FIG. 9, backend1 takes a checkpoint of its state at time $T_{ckp1\_1}$. The frontend waits for the checkpointing to be completed. If backend1 and backend2 reside on different machines, then the checkpoint file is copied from the backend1 machine to the backend2 machine. The frontend then instructs backend2 to terminate the faulty target program and restart a new target program using the checkpoint file. After the new target program has reached the same state as the non-faulty target programs, the frontend gives the continue command to all backends at time $T_{ci\_j}$. Depending on the restart policy, if the maximum restart threshold has already been reached, then the entire backend2 would be terminated and restarted on another machine. The new copy of the target program would also be restarted on the new machine.

If the fault that occurs on backend2 affects the target program such that it is unable to reach the voting breakpoint, the frontend will wait until a maximum wait threshold is reached and then declare backend2 to be erroneous. The same recovery process described above is then initiated. These types of faults can cause the target program to crash, to hang indefinitely, or to continue execution without encountering the correct voting breakpoint. In the last case, if another voting breakpoint is encountered, then the frontend will still determine that an error has occurred.

This illustrative error detection and recovery technique will tolerate all single occurrences of hardware faults, whether transient or permanent. Permanent faults will cause restarts to be migrated to a non-faulty machine. For "single fault occurrence," a second fault should not occur until the recovery process initiated by the first fault has been completed. Some types of software faults can also be tolerated. These software faults cause errors in the environment external to the target program, which in turn cause system calls in the target program either to return divergent values or to cause program termination. For instance, a memory leak in the target program may eventually cause a request for additional memory to produce a program termination when a subsequent access to the unallocated memory causes an illegal memory access error that is detected by the operating system. Of course, the selection of the voting parameters is very important. The data to be subject to voting may include the set of "critical" variables in the target program. The following are examples of such variables:

Control flow:
  Variables involved in control flow, such as variables in the conditional part of a branch or a loop.
Program output:
  Variables passed as parameters to output functions, including visual, file, and inter-process output.
Algorithm input and output:
  Variables used as input or produced as output by algorithms and functions, e.g., the input and output matrices of a matrix operation.

Several approaches can be taken to enhance the reliability of the frontend 100 of FIG. 7, since it is a potential single point of failure. For example, self-checking and recovery code can be added to the frontend 100 along with an external watchdog mechanism to ensure that the frontend remains operational. As another example, the single frontend process may be replicated with redundant voting. However, that would require a distributed consensus among the multiple replicated frontend processes. A distributed consensus-based vote among the backends could be used to eliminate the need for the frontend vote processing altogether.

The fault tolerance techniques described above have been implemented and tested using fault injection. Although the fault injection testing demonstrated that the technique is effective in tolerating the intended faults, there is an impact on performance. In the FIG. 9 example, the following sources of performance degradation can be seen: (1) The time to start up the backend software before the target program actually begins execution. This is shown as time $T_{bi}$-$T_0$ in FIG. 9; (2) The synchronization time at each vote. This is the time that each target program is stalled while waiting for the frontend to complete the vote tally and issue the continue command. In FIG. 9, this time is shown as time $T_{ci\_j}$-$T_{pi\_j}$ for unanimous votes and time $T_{ckpi\_j}$-$T_{pi\_j}$ for non-unanimous votes; and (3) The recovery time incurred after an error is detected. This time is shown as time $T_{ci\_j}$-$T_{ckpi\_j}$ in FIG. 9.

These and other overheads in the illustrative embodiment are attributable to various factors. First, the backend controller program incurs an overhead because it must compete with the target program for processor time. Second, the controller program incurs an additional overhead for managing the execution of the target program, including the management of breakpoints. Third, the voting process imposes a form of barrier synchronization on the target programs. The waiting time is especially conspicuous if the processing speeds of the backend machines are not equal because the faster machines will wait for the slow machine to reach the voting point. Fourth, because the frontend and backend are distributed, a communication overhead is incurred. Fifth, the recovery process requires some finite amount of time.

A variety of actions can be taken to decrease the overhead times in the illustrative embodiment, including, for example, the following: (1) decreasing the frequency of votes; (2) decreasing the size of the data to vote on; and (3) eliminating the requirement for target programs to stall execution until the outcome of the current vote has been detennined by the frontend. Action (1) would decrease the number of the $T_{ci\_j}$-$T_{pi\_j}$ overheads in FIG. 9. Action (2) would decrease the average $T_{ci\_j}$- $T_{pi\_j}$ time, but probably only slightly. As long as the data for voting is not very large, most of the $T_{ci\_j}$-$T_{pi\_j}$ time is composed of synchronization and communication overheads. Action (3) would completely eliminate the $T_{ci\_j}$- $T_{pi\_j}$ overhead, but would increase the complexity of the voting and recovery process because the target programs would no longer be synchronized. Thus, vote data must be saved until used, and recovery would necessitate the partial cancellation of some voting data.

It should be noted that the above-described illustrative embodiments of the invention can be implemented in computing applications other than those mentioned above, including other distributed and non-distributed computing applications. These and numerous other alternative embodiments within the scope of the following claims will be readily apparent to those skilled in the art.

What is claimed is:

1. A method of providing fault tolerance in a computing system, the method comprising the steps of:
  executing a plurality of different copies of a target program, wherein execution of each of the different copies is controlled by a corresponding controller which communicates with a user interface of an instrumentation tool; and
  detecting a fault in at least one of the copies by comparing values of at least one variable generated by the different copies for at least one designated breakpoint, wherein at least one of the variable and the breakpoint are specified by a user in the user interface of the instrumentation tool and communicated from the interface to the controllers, such that the fault is detected without modification of target program code.

2. The method of claim 1 further including the step of, upon detection of a fault in a given one of the copies, taking a checkpoint of another of the copies, and restarting a new copy from the checkpoint.

3. The method of claim 1 wherein the executing step includes executing each of the different copies of the program on a different machine.

4. The method of claim 1 further including the steps of:
  allowing the user to select at least a portion of a plurality of the variables and a plurality of the breakpoints in the user interface of the instrumentation tool; and
  delivering corresponding commands to each of the controllers.

5. The method of claim 1 wherein for each of a plurality of the breakpoints, each of the controllers reports the value of the at least one variable to a vote processing mechanism in the instrumentation tool.

6. The method of claim 5 wherein the vote processing mechanism is implemented in a process associated with the user interface of the instrumentation tool.

7. The method of claim 5 wherein the vote processing mechanism is implemented in one or more of the controllers.

8. The method of claim 1 wherein a given copy of the target program is identified as including a fault if its reported value of the at least one variable differs from those of the other copies of the target program.

9. The method of claim 1 wherein the at least one variable includes at least one of a control flow variable of the target program, a variable passed as a parameter to an output function of the target program, and a variable used as input or produced as output by a function of the target program.

10. An apparatus for providing fault tolerance in a computing system, the apparatus comprising:

at least one machine for executing a plurality of different copies of a target program, wherein execution of each of the different copies is controlled by a corresponding controller which communicates with a user interface of an instrumentation tool, and a fault is detected in at least one of the copies by comparing values of at least one variable generated by the different copies for at least one designated breakpoint, and further wherein at least one of the variable and the breakpoint are specified by a user in the user interface of the instrumentation tool and communicated from the interface to the controllers, such that the fault is detected without modification of target program code.

11. The apparatus of claim 10 further including a plurality of machines, with each of the different copies of the program executed on a different one of the machines, and wherein the user interface of the instrumentation tool is implemented on another of the machines.

12. The apparatus of claim 11 wherein, upon detection of a fault in a given one of the copies on a given machine, the machine on which the user interface is implemented directs another machine other than the given machine to take a checkpoint of its copy of the target program, such that a new copy can be restarted from the checkpoint.

13. The apparatus of claim 11 wherein the machine on which the user interface is implemented is operative to allow the user to select at least a portion of a plurality of the variables and a plurality of the breakpoints in the user interface of the instrumentation tool, and to deliver corresponding commands to each of the controllers on the other machines.

14. The apparatus of claim 10 wherein for each of a plurality of the breakpoints, each of the controllers reports the value of the at least one variable to a vote processing mechanism in the instrumentation tool.

15. The apparatus of claim 14 wherein the vote processing mechanism is implemented in a process associated with the user interface of the instrumentation tool.

16. The apparatus of claim 14 wherein the vote processing mechanism is implemented in one or more of the controllers.

17. The apparatus of claim 14 wherein the vote processing mechanism is operative to identify a given copy of the target program as including a fault if its reported value of the at least one variable differs from those of the other copies of the target program.

18. The apparatus of claim 10 wherein the at least one variable includes at least one of a control flow variable of the target program, a variable passed as a parameter to an output function of the target program, and a variable used as input or produced as output by a function of the target program.

19. An apparatus for providing fault tolerance in a computing system, the apparatus comprising:

means for executing a plurality of different copies of a target program, wherein execution of each of the different copies is controlled by a corresponding controller which communicates with a user interface of an instrumentation tool; and means for detecting a fault in at least one of the copies by comparing values of at least one variable generated by the different copies for at least one designated breakpoint, wherein at least one of the variable and the breakpoint are specified by a user in the user interface of the instrumentation tool and communicated from the interface to the controllers, such that the fault is detected without modification of target program code.

* * * * *